May 17, 1966 G. C. DEVOL 3,251,483
PROGRAMMED ARTICLE HANDLING
Filed Dec. 2, 1963 4 Sheets-Sheet 1
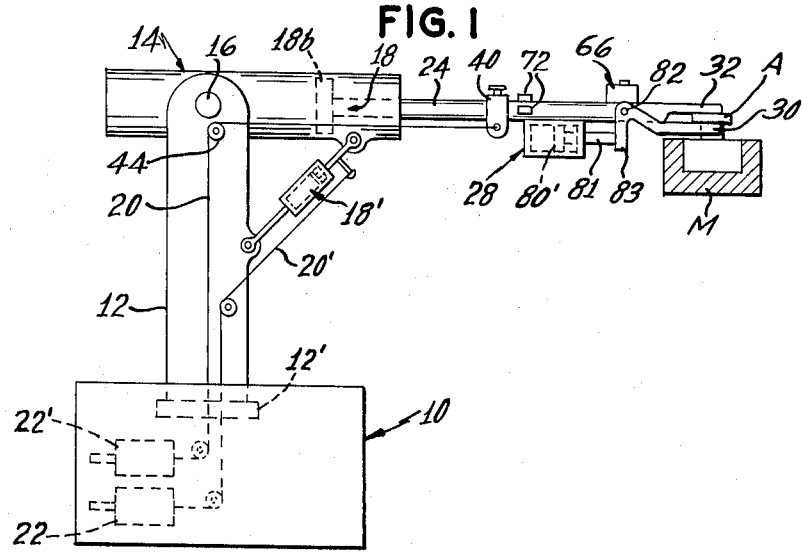
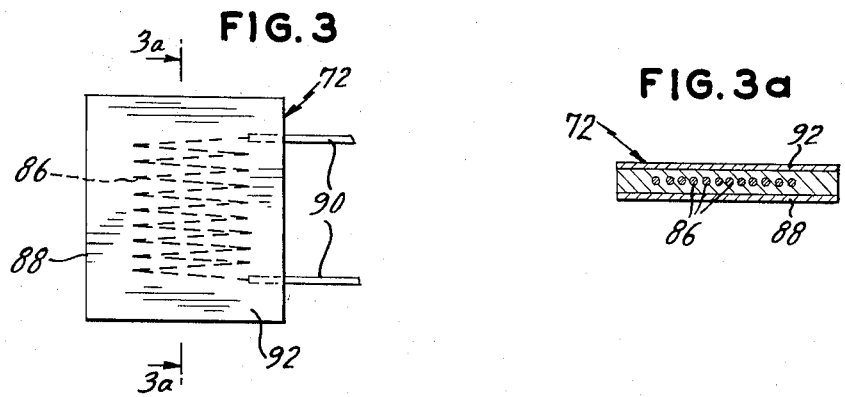
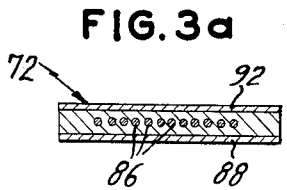
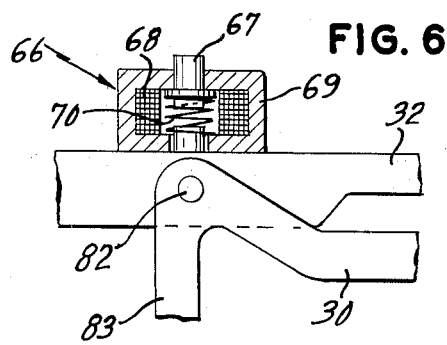
INVENTOR.
George C. Devol
BY
Paul S Martin
ATTORNEY May 17, 1966  G. C. DEVOL  3,251,483
PROGRAMMED ARTICLE HANDLING
Filed Dec. 2, 1963  4 Sheets-Sheet 2
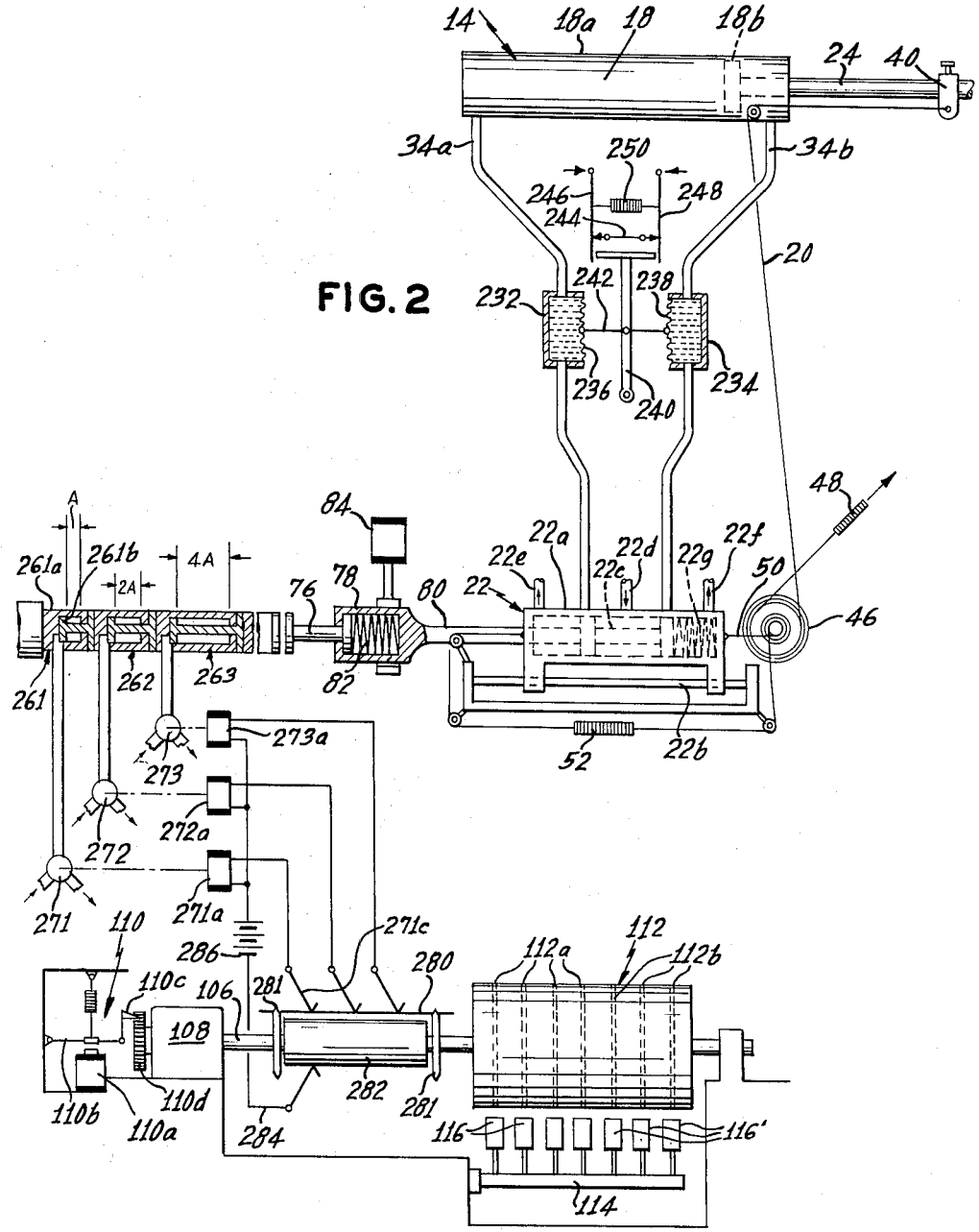
INVENTOR.
George C. Devol
BY
ATTORNEY May 17, 1966  G. C. DEVOL  3,251,483
PROGRAMMED ARTICLE HANDLING
Filed Dec. 2, 1963  4 Sheets-Sheet 4

INVENTOR.
George C. Devol
BY Paul S. Martin
ATTORNEY

United States Patent Office 3,251,483
Patented May 17, 1966

3,251,483
PROGRAMMED ARTICLE HANDLING
George C. Devol, Brookside Drive, Greenwich, Conn.
Filed Dec. 2, 1963, Ser. No. 327,475
21 Claims. (Cl. 214—1)

This invention relates to program controlled apparatus and more particularly to program controlled article handling machines and associated methods.

The present invention involves in some aspects improvements to the apparatus shown in my prior application, Serial No. 226,203, filed September 26, 1962.

The invention will be described with respect to program controlled apparatus which is adapted for removing a die casting from a die casting machine. The program controlled apparatus which is offered by way of illustration includes a work device constituted by a movable arm having an article holder at an end thereof. The arm is moved to a suitable position with respect to the casting and the latter is then gripped by the article holder. Thereafter the arm is actuated to withdraw the casting from the casting cavity. Occasionally, however, a casting is stuck and will not permit movement of the arm.

It is an object of the invention to provide improved apparatus of the above type which will detect situations such as that described and apply corrective action.

It is an object of the invention to provide means for establishing operating conditions for the apparatus related to the desired function to be performed and a device for detecting compliance of the apparatus with the conditions of operation.

According to a feature of the invention, the conditions of the operation may include a parameter which is a measure of a force. According to a further feature of the invention, the conditions of operation may include a parameter which is a time period in which an operation is to be performed. The conditions of operation may include both the parameters of time and force.

According to a further feature of the invention, when a particular time interval is allotted to a motion to be performed, the operation of the apparatus is suspended if the motion is not carried out within the allotted time interval.

It is a feature of the invention that the time interval for each operation that is executed under program control is established by feeding programmed combinational code instructions related to that operation through a matrix to suitable gating means which converts the time-interval code to a single time-representing quantity.

According to a still further feature of the invention, a strain sensitive device is appropriately located in the apparatus for detecting strain and for comparing the same with an allowable preestablished magnitude of strain.

The invention has particular application to apparatus that includes a servo system which receives program information and causes operation of the apparatus in response thereto. It is an object of the invention to interrupt the supply of driving power to the servo system, or to suspend programmed operation of the apparatus, or both suspend further operation of the apparatus and interrupt the servo operation when the established criteria of operation are not satisfied. Thus, unless an operation is being satisfactorily performed, the apparatus will not continue to operate.

In the preferred embodiment of the invention the apparatus includes a hydraulic actuator having two hydraulic lines. Fluid under pressure is supplied via a selected one of these lines to cause operation of the actuator. The pressure in the hydraulic lines is sensed and only when the pressures in the lines are effectively equal, indicating that the actuator is at rest, will the next operation of the apparatus be carried out. According to a further feature of the invention, a time limit is established in which a pressure imbalance may exist in the lines during any particular programmed motion. If the pressure imbalance exists for a period of time exceeding the allotted period of time, then the operation of the actuator is discontinued.

It is significant to note, therefore, that the apparatus will not carry out a subsequent operation until a previous operation has been completed, while in addition a signal is produced or the operation of the apparatus will be suspended, or both signalling and interruption of operation will occur, if the conditions of operation are not satisfied.

With regard to the specific illustrative example, it is an object to detect when the arm is excessively stressed in withdrawing a casting from the die casting machine, while it is a further object to provide programmed instruction as to the time period in which the casting is to be withdrawn.

Further objects and features of the invention will be more clearly apparent from the following detailed description of the illustrative embodiment of the invention shown in the accompanying drawings, this embodiment being given by way of example and illustrative of the concepts involved. In the drawings:

FIGURE 1 is an elevational view of apparatus according to the invention;

FIGURE 2 is a diagrammatical illustration partially in section of a portion of the embodiment of FIG. 1 showing the apparatus for the actuation thereof;

FIGURE 3 shows an enlarged detail of a portion of the apparatus in FIG. 2;

FIGURE 3a is a cross-sectional view taken along the lines 3—3 in FIG. 3;

FIGURE 6 is an enlarged cross-section of a detail in FIG. 1.

Figure 4:
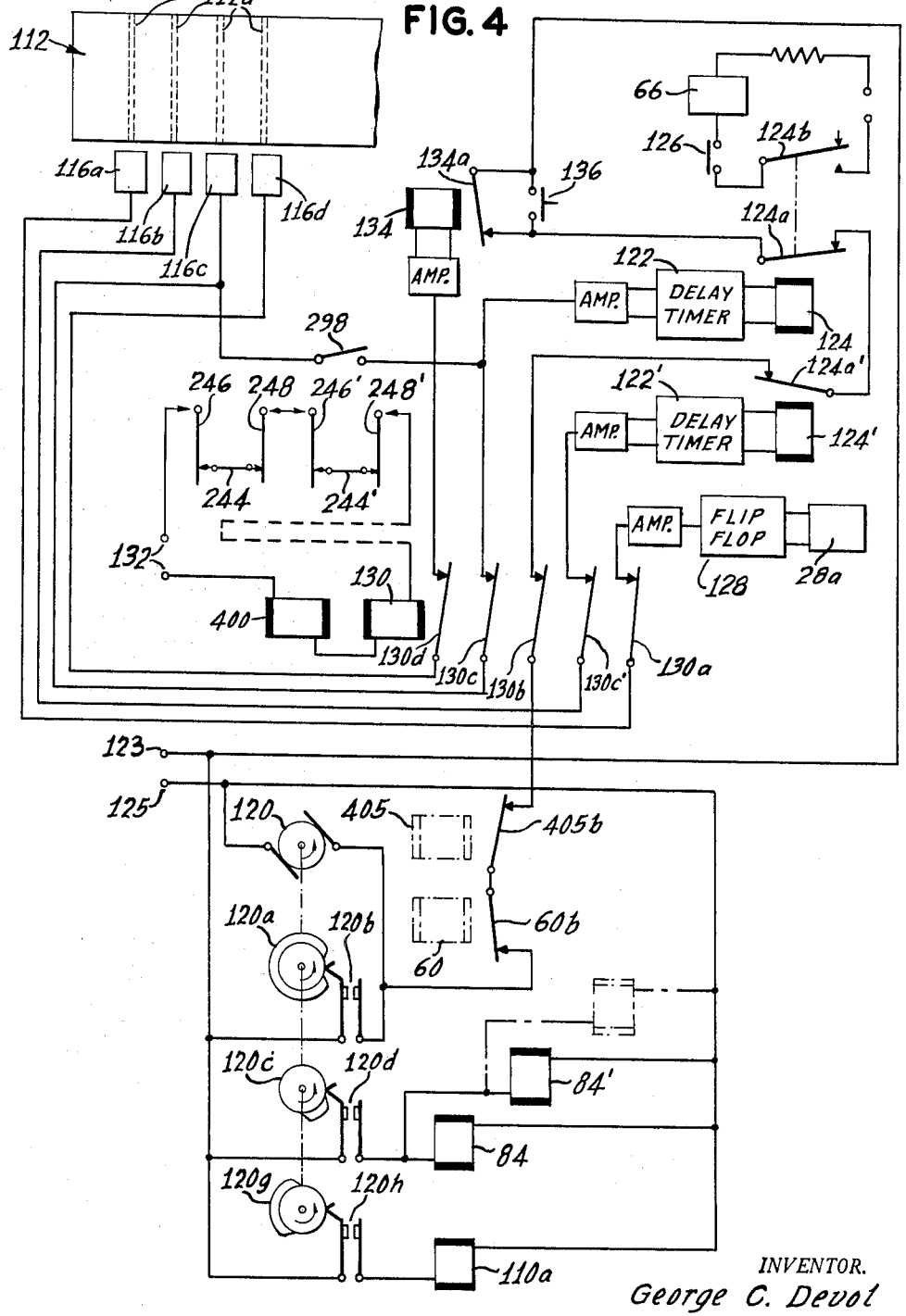
FIGURE 4 is a partial wiring diagram of the apparatus in FIG. 2, together with coordinated apparatus.

Referring now to FIG. 1, a machine base 10 is shown in which a post 12 is supported in a bearing 12' for angular movement. The post supports angularly movable arm 14. By means of a memory-controlled servo system (not shown) such as that in FIG. 2, post 12 may be rotated in bearing 12' in any desired series of programmed motions.

Arm 14 is pivotally connected by a pivot 16 to post 12, the upper end of this post being in the form of a yoke so that arm 14 can swing through large vertical angles without obstruction. The relatively movable parts of a hydraulic actuator 18' interconnects post 12 and arm 14. A cable 20' extends from the output end of hydraulic actuator 18' and over suitable pulleys to an internal master valve 22' of the hydraulic servo system. A shaft 24 extends from arm 14 and is operated by hydraulic actuator 18 in arm 14. A cable 20 extends from shaft 24 around a series of pulleys to a master control valve 22 of the servo system for operating arm 24. The master control valves 22 and 22' are mounted in base 10. A solenoid-controlled hydraulic actuator 28 is carried by shaft 24 for operating jaw 30 pivoted to shaft 24 and arranged to seize an article A in cooperation with fixed companion jaw 32 on shaft 24. The actuator 28 comprises a piston 80' having a shaft 81 connected to a bracket 83 which extends from jaw 30. The piston 80' is displaced in a selected direction to thereby move jaw 30 in order to open or close the jaws in accordance with the state of a solenoid, as will be explained more fully hereinafter. The article A may be a die casting which is formed in mold M, which is shown in open condition and from which the article can be removed.

Such apparatus can be utilized to perform innumerable functions when properly programmed, as will be shown hereinafter. The three motions described (about post 12, about pivot 16 and along shaft 24) are purely illustrative of additional motions that may be desired, such as twisting motions and wrist-bend motions of the article-gripper 30, 32. The apparatus performs as a programmed robot in carrying out a complex sequence of coordinated motions.

Programmed servo controlled motions may be executed by means of control apparatus such as that shown in FIG. 2. For purposes of explanation, the control apparatus will be described for actuator 18, it being understood that the operation of this actuator is merely exemplary of the operation of all the actuators. The apparatus of FIG. 2 includes hydraulic actuator 18, comprising a cylinder 18a supported in the arm 14 and a piston 18b from which the usual guided shaft projects, in this case the guided shaft being arm 24. This hydraulic actuator represents any one of the actuators needed for any one of the motions required. In the form illustrated, cylinder 18a is relatively stationary, and mechanical work is obtained from shaft 24. Piston 18b and shaft 24 are moved to the right and the left by means of hydraulic fluid admitted under pressure to the respective ends of cylinder 18a, in usual fashion, this fluid being supplied by hydraulic lines 34a and 34b. The master valve 22 for controlling the operation of actuator 18 includes a body 22a that is slidably mounted on a fixed guide rail 22b, which has a square cross-section. Valve 22 includes a so-called spool 22c that is appropriately shaped with respect to apertures provided in the body 22a to deliver hydraulic pressure to either one of the hydraulic actuator lines 34a and 34b, or to maintain the fluid supply to both of those lines equal when the hydraulic actuator is to remain stationary. Lines 34a and 34b are flexible where they are connected to actuator 18 and to reciprocating body 22a of the control valve. Hydraulic fluid under pressure is supplied to valve 22 from the high pressure end of a supply of pressurized hydraulic fluid (not shown) by a supply line 22d. Hydraulic fluid from the low-pressure side of actuator piston 18b is returned by the corresponding line 34a or 34b to valve 22, and this fluid is returned to the hydraulic system by lines 22e and 22f. The arrows in the drawing represent the supply and discharge directions of flow of the fluid. Appropriate hydraulic servo valves and systems for this apparatus are commonly available, and are disclosed, for example, in Sec. 15 of "Control Engineers' Handbook," 1st Ed., edited by John G. Truxall and published 1958 by Mc-Graw-Hill Book Company. Also, while a simple master servo valve is shown diagrammatically, it will be understood that the master-valve part of the servo may include a pilot valve and a control valve. Lines 34a and 34b contain chambers 232 and 234 having diaphragms 236 and 238 connected to each other and to pivoted T-shaped member 240 by a rod 242. A stationary double-ended contact element 244 is engaged by pivoted contact elements 246 and 248 that are biased toward each other by tension spring 250, but are electrically insulated from this spring.

In the balanced condition of the actuator, both lines 34a and 34b have equal pressure. This may be the exhaust pressure or it may conceivably be some higher pressure due to the nature of the control valve 22. In any event, when piston 18b comes to rest there are equal pressures at its opposite sides. With this pressure equaltiy, member 240 is centered and both elements 246 and 248 are in contact with the ends of element 244. If there is any imbalance of pressures, energy presumably is being supplied to actuator 18 and in that condition of the servo, member 240 moves one or the other element 246 or 248 out of contact with element 244. The member 240 and elements 246 and 248 constitute a pressure switch means which is sensitive to a difference in pressure in lines 34a and 34b. The arrangement of the pressure switch means does not depend upon disappearance of pressure in both lines as an indication that the actuator has attained its balanced condition. Instead, the balanced condition of diaphragms 236 and 238 will provide the representation of balance that exists even if the particular hydraulic system used should trap fluid under pressure when balanced.

There is a feed-back connection between the master or control valve 22 and the actuator 18, so as to constitute a servo system. This feed-back system includes a clamp 40 that is adjustable along shaft 24 and may be fixed in place at a desired location. The cable 20 extends around fixed pulley 44 and around the large-diameter portion of stepped pulley 46 and then to a tension spring 48. Another cable 50 extends from valve body 22, around a small-diameter portion of stepped pulley 46, and around other pulleys to the opposite end of valve body 22, and it is maintained taut by tension spring 52. Pulley 46 has a number of different small-diameter portions and a number of different large-diameter portions, so that the travel of cable 20 may bear any desired ratio to the much smaller travel of cable 50. Because of this ratio, body 22a of the master valve need move through only a short stroke in achieving a long-stroke mechanical output of the hydraulic actuator 18. The hydraulic servo involving valve 22 and actuator 18 with the feed-back coupling system, as described, can be controlled for operation through any portion of its operating range by mechanical input to spool 22a. The starting position of the mechanical output element is controlled by adjustment of the feed-back coupling clamp 40 along shaft 24. The small-diameter portion of pulley 46 is also made readily adjustable in relation to the large-diameter portion to permit an alternative starting point adjustment. Cables 20 and 50 are shown wrapped around nearly 360° of the pulley; and if this does not provide sufficiently positive coupling between the two, the cables can be appropriately formed with bumps, teeth or links for mesh with a correspondingly formed pulley in order to completely avoid slip and creep.

For the purpose of providing mechanical control input to the hydraulic servo, the apparatus of FIG. 2 includes program control apparatus. The program control apparatus comprises a cascade of hydraulic actuators 261, 262, 263, etc., arranged in line and slidably supported in line with sensing tip 76 secured to the hydraulic valve for movement therewith. Sensing tip 76 is telescopically received in a tube 78 carried by shaft 80 which extends from master valve spool 22c. A spring 22g within the valve normally moves spindle 22c to the left. Another spring 82 within tube 78 normally biases sensing tip 76 to the extended position illustrated, limited by abutting portions of the tube 78 and the sensing tip 76 as shown.

An electromagnetic brake 84 is shown, having a spring-biased movable portion which suitably engages the external extension of valve spool 22c, including tube 78 and shaft 80, to hold the valve spool in a fixed position when the brake is deenergized. When the brake 84 is energized, the brake is released. Actuator 261 includes a cylinder 261a and a piston 261b that extends outside cylinder 261a and bears against the cylinder end of unit 262. Piston 261b has an accurately established clearance in cylinder 261a so that, when hydraulic fluid enters the left-hand end of the cylinder, the piston moves through a stroke "A." Unit 262 has an internal clearance between its piston and its cylinder such that it effects a stroke "2A" when actuated, that is, twice the stroke of unit 261. Likewise, unit 263 is proportioned to provide a stroke 4A, and so on, all of the additional units having successively doubled strokes in sequence. The number of units and their strokes are chosen to fit the requirements for maximum length of stroke and maximum permissible error between the stroke that the apparatus can make and the stroke desired. The maximum error will necessarily be "$A/2$."

Valves 271, 272, 273, etc., and their related operating electromagnets 271a, 272a, 273a, etc., are operable to deliver hydraulic fluid under pressure to units 261, 262, 263, etc., or to discharge fluid from those units into the exhaust part of the hydraulic system. Electromagnet 271a is connected to a sensing brush 271c which rests on a perforated program control member 280 such as a strip of paper on conductive roller 282. In the event that a perforation is sensed by brush 271c, an energizing circuit for electromagnet 271a is established through brush 271c, cylinder 282, wire 284, electric power source 286 and wire 288. Similar circuits may be traced from the other electromagnets to the corresponding brushes. Each row of perforations (or imperforate areas) under the row of brushes provides a control combination representing a destination to which the servo is to drive.

The feed of the perforated control member 280 is effected by sprocket members 281 connected to shaft 106 and the timing and coordination of brake operation, record-feed, etc., is provided by the circuits shown in FIG. 4, which will be more fully discussed hereinafter. The shaft 106 is supported in bearings including the bearings of unit 108 having a motor and built-in speed reduction gearing. The shaft 106 is advanced step-wise by a suitable indexing mechanism 110. For example, this includes an electromagnet 110a, its pivoted armature 110b, pawl 110c and ratchet 110d which is fixed to shaft 106.

Shaft 106 also carries a master program storage member 112 which is in the form of a magnetic drum having control tracks 112a extending in a circle about the drum. A portion of the drum is provided with three control tracks 112b which, as will be discussed hereinafter, constitutes a portion of a programmed timer arrangement. A shaft 114 supports a row of sensing heads 116, each being positioned to sense a respective spot or area of each circular track and to provide different output depending upon the magnetic state of the area on drum 112 that is in sensing position. Those areas or spots positioned opposite heads 116 at any one time form a control "slot." Sensing head 116, in this embodiment, is of a well-known type that is capable of sensing a magnetic spot when there is no relative motion between the drum 112 and the sensing head 116, such heads conveniently being termed "at-rest" sensing heads. For example, such head may be of a form shown in my earlier U.S. Patent 2,988,237, issued June 13, 1961. For simplicity, it may be assumed that the control tracks 112b, 112a, on drum 112, are either magnetized or not magnetized to distinguish "on" and "off" instructions. When there is a magnetic spot under this assumption, it will be understood that magnetic sensing head 116 provides an output and does not provide an output when the area of the drum 112 that is opposite the sensing head is not magnetized. It will be recognized that the information on control member 280 advances in step with that of drum 112, and therefore all of the information including that provided by member 280 can be provided by the drum 112, using an appropriate number of control tracks.

All of the apparatus interposed between perforated control member 280 and the sensing tip 76 of the servo, operates to present each new displacement instruction to the servo. This takes place while the servo is proceeding to the destination according to the previous instructions under control of its input part 78 that is held in its previous setting by brake 84. As soon as the servo reaches the previously instructed destination, the part 78 is released by brake 84 and quickly assumes a new setting in accordance with the combination of pressurized units 261, 262, 263, etc. The brake is promptly reapplied and the programming resumes as before. The successive strokes follow in sequence with almost no pause between strokes except such as is dictated by other coordinated functions and deliberately programmed dwells.

The operation of the apparatus thus far described may be reviewed at this point:

It may be assumed that sensing tip 76 has been set in accordance with the desired position to be assumed by shaft 24 of the hydraulic servo actuator. It may also be assumed that shaft 80 is set in a position corresponding to sensing tip 76 and that brake 84 has just been released and grips shaft 80. Under these conditions, hydraulic fluid is delivered by one hydraulic line 34a or 34b to hydraulic actuator 18. This flow continues until mechanical output shaft 24 reaches the position required by the instruction from program control member 280. This is achieved when valve body 22a has been shifted by the servo feed-back coupling including cable 20 and cable 50 to the place where hydraulic fluid is no longer delivered to the hydraulic actuator, that is, until valve body 22a has shifted to the "off" or balanced position relative to the spindle 22c of the valve. Where the servo system utilized is a hydraulic type of servo as shown, then the approach of the mechanical output member 18c to its required end position is reached in a fast motion that is decelerated automatically as the valve approaches its "off" or balanced condition. This deceleration is highly desirable and is here achieved without resort to additional complicating control apparatus.

It was assumed that shaft 80 is locked by brake 84 while the hydraulic servo system seeks the destination dictated by the position of shaft 80. During the time that the hydraulic system is in such operation, the program control apparatus is also in operation to present the next destination instruction to sensing tip 76 of the servo control valve. Stepping mechanism 110 advances program member 280 to position the next perforated instructions under the brushes 271c. At this time the brake 84 still grips and arrests shaft 80 in its previous programmed position. Depending on the instruction received, the shaft 80 is to remain stationary or be moved either to the right or to the left. If the shaft is to be moved to the right, the tip 76 is moved to the right and in so doing it compresses spring 82. Thereafter, when brake 84 is subsequently released, spring 82 expands fully and element 80 is moved to the right until the abutting portions of sensing tip 76 and tube 78 engage one another. If the shaft 80 is to be moved to the left, the pistons of pressure units 261, 262, 263, etc., move to the left, while tip 76 remains engaged against the abutting portions of tube 78. When the brake 84 is thereafter released, spring 22g urges the shaft 80, with the tube 78 and the tip 76 therewith, to the left until tip 76 once again is in contact with the extended piston of units 261, 262, 263, etc.

When the actuator 18 has completed the stroke required by the locked position of shaft 80, the pressure balance switch will be centered and elements 246 and 248 will be in contact with element 244. This initiates a new cycle of operation. If the next step in the cycle dictated by program control member 280 is to direct the hydraulic system to its next position, then brake 84 is released under control of apparatus detailed below. Spring 82 or spring 22g (as the case may be) drives shaft 80 to assume its next control position and the above sequence of operations is repeated. Hydraulic actuator 18 starts promptly to operate toward the new position. Brake 84 locks shaft 80 in its new position.

The foregoing program-controlled servo system utilizes combinations of units 261, 262, 263, etc., that are selectively pressurized under control of the perforations in program member 280 for extending and retracting arm 24. Program member 280 (or additional program members advanced in synchronism with it) may similarly provide for servo control of actuator 18' and 12' and any other actuators that are used for displacing jaws or article gripper 30, 32 to the various positions that may be desired. In the example given, jaws 30, 32 are moved into position to seize article A, they are operated by actuator 28 to grip an article, and the various servo actuators 18, 18', 12', etc., are then operated under program control to remove article A from the casting machine M for transfer to another station, which may be a conveyor to which the article is delivered.

It occasionally happens that the article remains engaged in the cavity, and as the article-removing operation is attempted by the apparatus, great stresses develop. Similar stresses could develop at other parts of the programmed sequence of motions whenever the apparatus is abnormally impeded, as by an obstruction. The following provisions are made for reducing the possibility of damage to the apparatus or to the article as a result of such conditions.

According to a first abnormal-operation detector, strain-sensitive means is provided to detect load in the apparatus beyond a prescribed limit. The strain-sensitive means comprises one or more resistor strain gages 72, which are applied to any appropriate part of the apparatus, to shaft 24, for example, for indicating the condition of strain in the shaft. Strain may be taken as representative of the degree of force which is being applied to the workpiece and the force may be limited to a suitable value dictated by the design of the apparatus and/or the nature of the article being treated. A pair of strain gages 72 have been shown applied to shaft 24 at a point far enough removed from jaws 30, 32 to reveal bending stress. The strain gage, when placed on arm 24, responds to abnormal stresses without such stresses being masked by the addition of momentary normal stresses that may develop elsewhere in the apparatus, where such normal stresses result from acceleration of masses forming part of the apparatus itself. However, these strain gages or additional gages may be applied at other locations in the apparatus where abnormal stresses may be imposed as a result of the article gripper encountering an obstruction or where stresses develop otherwise as a result of the programmed operation being abnormally impeded. As examples of suitable location, the gage may be incorporated in the pivot 16 or in any of the actuators and even at jaws 30, 32, in each case using an appropriate form of strain detector.

Strain detection elements 72 may be one of a number of types, but the bonded resistance-strain gage will be described as a suitable example. The gage is applied to shaft 24, which will be subjected to bending stresses during removal of the article from the casting machine.

The gage is shown in greater detail in FIGS. 3 and 3a. Basically, the resistor-strain gage 72 consists of a length of strain-sensitive resistive wire or filament 86 mounted on an insulating backing 88. The backing facilitates handling the filament and also acts to insulate the wire from the surface on which the gage is to be bonded. The illustrated strain gage includes a length of metallic wire of the order of 0.001 inch diameter, in the form of a grid as shown in FIG. 3. The grid is mounted on a backing 88, such as a piece of paper, and the grid is cemented in place. The resistive wire is secured to protruding terminal leads 90 of larger diameter and covered by another piece of paper 92 cemented over the wire. Resistive-strain gages of this form, as well as gages made of an etched foil, are readily available commercially.

The gage is applied to the element 24 by cementing the backing 88 to the element. As the element 24 undergoes strain, the strain-gage wires undergo a change in length and they also undergo a change in electrical resistance. The change in resistance is a measure of the strain on the member, which in turn is a measure of the load on the arm. The amount of resistance change in the gage corresponds to the load applied to the arm.

The strain gage may also be a piezo-resistive strain gage composed of a piece of semi-conducting material provided with terminal electrodes and cemented to a carrier and then covered by insulation. Illustrations of numerous types of applicable strain gages can be found in "The Strain Gage Primer," by Perry & Lissner, 2nd Ed., McGraw-Hill 1962, pgs. 20–23.

The response of the gage to variation of strain in arm 24 is measured by incorporating the gage 72 in a Wheatstone bridge 156, such that a null or balance condition is initially obtained in the bridge. The strain in the element 24 can be determined by measuring the output of the bridge which is a function of the change in resistance of the gage.

It will be seen hereinafter that the strain gage can be utilized to prevent overloading of the shaft 24.

As an additional safeguard against damage due to obstructions, the pressure balance switches such as contacts 244, 246 and 248 (FIG. 2) are utilized to indicate the duration of any given operating stroke. Excessive time consumed by a given operation signifies trouble. The pressure switches commence the discharge of a charged capacitor 303 (FIG. 5) across a resistor 304 when the pressure in the lines 34a and 34b becomes unbalanced in response to displacement of the spools in the master valves. The capacitor decays at a known rate, its voltage at any instant being a function of the size of the resistor and the capacitor and of the stored voltage. The known decay rate can be utilized in an electrical timer which will be described more fully hereinafter to interrupt the operation of the apparatus when a pressure unbalance exists for too long a period of time. An excessive time will be taken in an article-removing operation in the event that the article remains stuck in the casting machine.

Interruption of machine operation should be confined to true emergency conditions. To minimize such interruptions, means is provided for promoting release of an article from the casting machine. For this purpose a mechanical rapping or striking device 66 is here fixed to the article gripper and it is excited while the gripper is in its programmed article-engaging position, although (depending only on the program set into the apparatus) the excitation can otherwise or additionally occur during the article-extracting motion of the apparatus. Striker or rapping device 66 can take the form of a fluid-pressure operated vibrating hammer or it may be an electromechanical striker. The form of striker shown in FIG. 6 has an armature 67 that is impelled toward the base of gripper 32 by coil 68 in pole structure 69 and restored to its at-rest position by spring 70. Repeatedly pulser or alternating current excitation is supplied to coil 68 at times determined by the program control of the apparatus (as will be described) so as to be coordinated with the operation and transfer motions of the article gripper.

Armature 67 is arranged to vibrate along a line perpendicular to the confronting faces of gripper jaws 30 and 32. In this way, firm application of mechanical shocks is transmitted to the article being gripped without any tendency of the gripper and the article shifting in relation to each other. However, an additional or substitute striker may be mounted to reciprocate the armature at right angles to that of device 66, acting along or across the axis of shaft 24. Further, the striker or rapper may be disposed eccentrically to apply oscillatory blows to the jaws, about the axis of shaft 24, for example.

Figure 5:
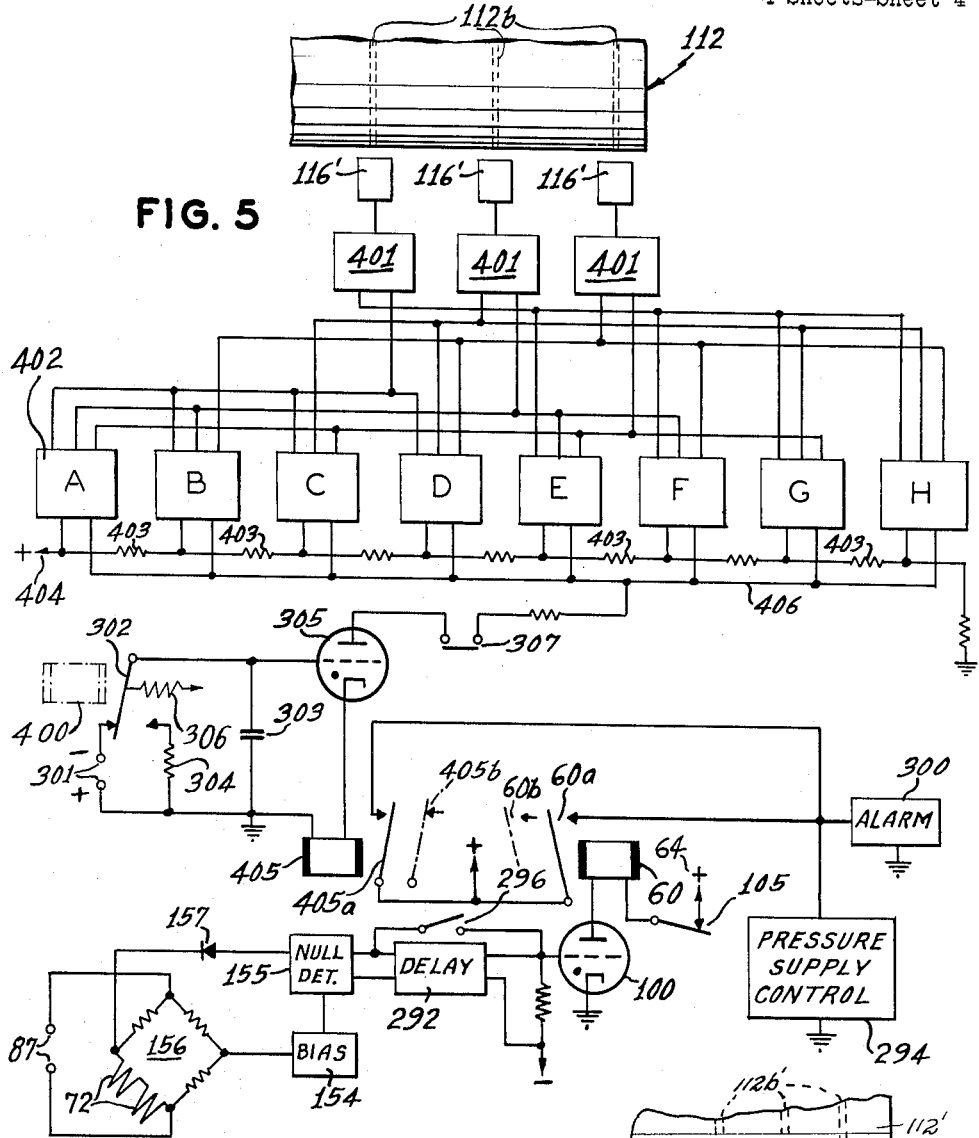
FIGURE 5 is another portion of the wiring diagram of the apparatus in FIG. 2.

The wiring diagram of the various actuators and motors in FIG. 2 is shown in FIG. 4, wherein additional coordinating and coordinated devices are included. FIG. 5 shows the strain gage 72 and the programmed timer and the elapsed-time comparing circuit.

In FIG. 4 there is a cycle timing motor 120 which is energized by a power tource connected at input terminals 123 and 125 by a control circuit. The control circuit includes the pressure switch means including elements 244, 246 and 248 and will be discussed more fully below. Motor 120 operates cams 120a, 120c and 120g which operate respective cam contacts 120b, 120d and 120h. Momentarily after motor 120 starts to operate, cam 120a closes cam contacts 120b to complete a holding circuit so that motor 120 will complete its cycle after it has once been started by its control circuit. Cam contacts 120d are connected in series with servo-lock or brake solenoid 84 and the servo-lock or brake solenoids 84', etc., of other hydraulic servos 18', etc. As mentioned above, the servo-control locking device 84 or brake is normally spring-biased to lock shaft 80, and is energized momentarily to release or unlock shaft 80. Cam 120c is rotated counterclockwise, as are the other cams of timing motor 120. The servo locks or brakes are released only momentarily and this occurs at the beginning of the timer cycle but after the timer "hold" contacts 120b close. For this reason, the timer operation is sustained despite the opening of elements 246 and 248 of the pressure switch means.

A further cam 120g and cam contacts 120h operated thereby are effective to energize actuator 110a for indexing program shaft 106. This occurs only during a part of the cycle when cam contacts 120d are open.

The foregoing represents the normal timer-controlled sequence of operations of the program drum, brake 84 and the remainder of the hydraulic servo actuator 18. It is understood that the other controlled motions of the hydraulic servo systems are controlled concurrently and in the same manner.

Timer motor 120 has a control circuit that includes elements 244, 246, 248 in series, and these are in series with like pressure switches 244', 246' and 248' of another hydraulic actuator; and further pressure switches are included as required by the hydraulic actuators utilized. All thesse pressure-switches are in series with the winding of relay 130 and the winding of relay 400 in a circuit connected to supply terminals 132. Relays 130 and 400 are energized only when all the pressure balance switches are closed. Thus, the completion of the respective program-controlled strokes of all the servo actuators in the apparatus is symbolized by energization of relays 130 and 400. Relay contacts 130b are in series with timing motor 120, and if other contacts in series with contacts 130b are closed, the timing motor will start its cycle. Such other contacts are described below, and generally are for delaying further programmed servo strokes until programmed functions have taken place. Progressing from one programmed set of servo-actuator strokes to another is thus dependent jointly on completion of the coordinated servo-actuator strokes and on completion of the programmed functions.

The programmed concurrent set of servo actuator strokes can follow one after another, or such operations can be modified in a number of different ways to enable the automatically controlled article handling apparatus of FIGS. 1 and 2 to cooperate with other apparatus and to effect other operations. Such other operations are carried out under control of drum 112 and sensing heads 116a, b, c, and d. In its output, each of these sensing heads includes appropriate circuits, as an amplifier, a rectifier, etc.

Sensing head 116a provides a sequence of signals to a bistable "flip-flop" 128 that alternately energizes and deenergizes an electromagnetic valve 28a that controls actuator 28 of the jaw 30. These signals are supplied via contacts 130a of relay 130. So long as hydraulic actuator 18 (FIG. 2) is in operation, there is high pressure in one of its lines 34a or 34b. When actuator 18 reaches its destination as dictated by the set and locked position of its servo-input shaft 80, the pressures in both hydraulic lines 34a and 34b drop and the pressure balance switch is closed. Correspondingly, the pressure balance switches of another hydraulic actuator 18' will close when that actuator reaches its required position, and so on for pressure switches of the other program-controlled servo hydraulic actuators of the apparatus. When all of the actuators 18, 18', etc., have come to rest, all the pressure switches close and relay 130 is energized. Contacts 130a are closed, and then the sustained signal from at-rest sensing head 116a is transmitted to flip-flop 128. Presuming flip-flop 128 was previously in its "jaws-open" condition, then this signal causes the flip-flop to reverse into its "jaws-closed" condition. The jaws remain closed until another signal is subsequently supplied to flip-flop 128 from pickup head 116a.

There is always a possibility of spurious signals occurring to "confuse" flip-flop 128 and thereby cause opening of the jaws 30, 32 when they should close, and vice versa. To avoid such a contingency, two separate pickup heads could be used with two separate tracks 112a if definite "open" and "close" instructions are desired, in place of the described "open-close-open" sequence of jaw operations in response to successive "jaw operate" control spots.

Sensing head 116c provides a control signal via relay contacts 130c to start delayed operation of a delay timer 122 for energizing relay 124 and opening contacts 124a while closing contacts 124b for a short time interval. The contacts 124b are in a circuit including striker 66 connected to a pulsed or alternating current supply. Thus, the striker 66 is operated when contacts 124b close so as to apply rapidly recurring mechanical shocks to the gripper 30, 32 and an engaged article thereby. If desired, contacts 126 may be employed for sensing a closed condition of article jaws (as contacts of a pressure switch in the line supplying actuator 28 of the gripper) and such contacts in the circuit for the striker will insure that the mechanical shocks will not be initiated until after the jaws have gripped the article. Any suitable monostable circuit or mechanical delay device may be used for the delay timer. Contacts 124a are in series with cycle timing motor 120. So long as the delay timer keeps contacts 124a open, the cycle timer will remain idle and hydraulic servos 18, 18', etc., will remain in their programmed positions. Additional delay timers may be desired for many further reasons. For example, pick-up head 116b, delay timer 122' and relay 124' may be utilized for providing a dwell in the motion sequence of the apparatus, while a hot casting is held immersed in a quenching liquid, before starting the next program-controlled stroke. Another application of such delay is to allow time for article-gripping jaws 30, 32, to operate under control of its actuator 28 before starting the next stroke. A number of additional delay timers, with different sensing heads 116, may be utilized for providing other delay times, as may become desirable.

Pickup head 116d operates a relay 134 for opening contacts 134a in series with relay contacts 124a, 124a', and 130b and cycle timer 120. So long as drum 112 remains in a position in which pickup head 116d continues to deliver an output signal representing a control recording, relay 134 remains energized. During this same time, contacts 134a remain open, and the circuit to cycle timer 120 is broken. This produces an indefinitely prolonged interruption in the programmed sequence. Such an indefinitely long delay may be necessary in order to allow time for an attendant or a related apparatus to carry out a necessary function supplemental to the operation of the automatic apparatus. A switch 136 that bypasses contacts 134a is provided, to be closed manually by the attendant or by the related apparatus when that operation has been completed.

It will be apparent from the foregoing description that the conclusion of each set of operations dictated by drum 112 must take place before cycle timer 120 can proceed. Relay contacts 130b are in series with contacts 124a, 124a' and 134a of the coordinated-function relays for this purpose. However, if there are no supplementary functions to be accomplished in any given position of drum 112, then none of the pickup threads 116a, 116b, 116c or 116d will produce an output signal. In that event, completion of one set of operating strokes of the programmed servo actuators 18, 18′, etc., will be immediately effective to initiate operation of cycle timer 120. This causes prompt release of each servo-control lock or brake 84 on shaft 80, thereby establishing a new position for each shaft 80 in accordance with the pressurized units 261, 262, 263 and this promptly initiates the next following programmed strokes of the servo actuators. At the instant that servo-control locks 84, 84′, etc., are released by closing of cam contacts 120d, shafts 80 assume their next programmed positions and all the hydraulic servo actuators 18, 18′, etc., start their next strokes of operation. Timer 120 continues to advance and as it does brakes 84, 84′, etc., lock shafts 80 in their new positions. The drum-advance electromagnet 110 is then operated and this advances the next control portion of perforated control member 280 as well as the next "slot" of drum 112 into control position opposite the pickup heads 116a, b, c, and d, etc. The servo-control shafts 80 all remain locked in their previously set positions and the corresponding servo systems continue to carry out the instructions to proceed to the previously dictated positions. Upon completion of these operating strokes, the pressure balance switches previously described are all closed, and the ensuing functions take place as already described.

The apparatus proceeds step-by-step through its program as indicated by drum 112 and by the program control member 280 until the desired sequence of functions and motions have been completed. This will ordinarily occur before the end of the total capacity of the program storage has been utilized. Automatic control means not part of the present invention but fully described in my application Ser. No. 226,203 returns drum 112 to its home or sequence-starting position to initiate another programmed sequence of motions.

Referring to FIG. 5, the operation of the apparatus in conjunction with the strain gage 72 may now be considered. The strain gage is arranged to modify the operation of the apparatus to relieve any excessive strain that develops and to interrupt the program. The strain gage is connected in a Wheatstone bridge 156. This bridge is initially balanced when the gage is not under strain and when the gage has a particular resistance.

The output terminals of the Wheatstone bridge are connected in a circuit including diode 157, null detector 155 and power source 154. The null detector 155 is operative to detect unbalance in the circuit. The null detector is connected to a delay timer 292, which is connected to the grid of thyratron 100. A negative bias supply is also applied to the grid of the thyratron to provide a hold off bias which normally precludes firing of the thyratron. The anode-cathode circuit of the thyratron is energized by a voltage source 64. When strain gage 72 is strained as a result of the application of load to shaft 24 there is an output across Wheatstone bridge 156 tending to balance source 154. The output of the bridge initially tends to balance source 154 as the strain in shaft 24 rises to a prescribed level. When such a condition is exceeded, the null detector 155 sends a signal to delay circuit 292. The delay circuit 292 may include a timer-starting relay, a charging bias supply and a resistance-capacitance timing circuit as discussed below in connection with FIG. 5. During the delay time of circuit 292, the thyratron remains negatively biased by its hold-off bias source and consequently is not fired.

After the passage of the time established by the delay circuit 292, if the strain gage 72 still signals overloading of shaft 24, then the delay timer will impress a signal on the thyratron grid to diminish the bias on the grid to permit the thyratron to fire. Thus the thyratron will be fired only after the strain gage 72 has exceeded a prescribed limit of strain for a particular period of time.

A manual switch 296 is connected between the input and output of the delay circuit 292 for bypassing the latter if desired. Switch 296 is allowed to remain open whenever the apparatus is to be allowed a time interval in which it may itself overcome an obstacle. This is particularly useful where relay 124 (FIG. 4) is arranged to operate striking device 66 during a transfer motion of actuators 18, 18′, etc. Manual switch 298 that bridges contacts 130c should be closed whenever striking device is to operate during the strokes of hydraulic actuator 18 and others like it. Switch 298 can be a relay controlled by a corresponding pick-up head 116 if programmed control of switch 298 is desired. Closure of switch 298 allows striker 66 to operate during transfer motions of gripper 30, 32, enabling the apparatus to pull at a stuck article while maintaining the rapping of device 66.

Relay 60 is energized when thyratron 100 fires, causing contacts 60a to close, to thereby energize pressure supply control 294 which drops the pressure supplied to high pressure line 22g (FIG. 2) to a low level, below any value that would produce harmful strain.

A spring-loaded reset switch 105 is provided in the anode circuit of tube 100 to interrupt the supply of current to relay 60 and to extinguish the tube 100. This enables an attendant to return the apparatus to continued programmed operation after correcting the difficulty.

As has been shown hereinbefore, it is contemplated that electrical motion timing means may be utilized to detect when the shafts of the hydraulic actuators have not carried out any particular prescribed motion in a given time period. The motion timer may be utilized in addition to the strain-responsive means, or may be used as an alternative thereto, and may be used together with striker 66.

The motion timer detects the condition in which the shafts of the actuators 18, 18′, etc., do not carry out their prescribed motions in a given time period. This will thus provide an indication of failure of the apparatus to remove a casting that remains locked in a casting machine from which the transfer apparatus should normally extract the casting in a short time interval.

The circuit comprising the motion timer (FIG. 5) includes the voltage source 301, the capacitor 303 and resistor 304. A switch 302 is ordinarily held in the position shown in solid lines by means of the relay 400 (see also FIG. 4) and against the action of the spring 306. In this position, source 301 charges capacitor 303. The switch 302 forms a contact set of relay 400. The relay is connected in the circuit including relay 130 and the pressure balance switches 244, 246, 248, 244′, 246′, 248′, etc. When the pressure balance switches of all of the actuators are in balance, the relay 400 is energized and contacts 302 are urged to the position illustrated in solid lines. At the instant when any of the pressure balance switches detects an imbalance of pressure, which occurs at the start of each programmed motion of the actuators 18, 18′ etc., the switch 302 moves to disconnect the voltage source 301 from the capacitor 303 and to connect the capacitor to the resistor 304. The energy stored in the capacitor is discharged through the resistor according to an exponential decay function which can be controlled by adjusting the voltage of source 301 and the sizes of capacitor 303 and resistor 304. Source 301, capacitor 303 and resistor 304 are connected to the grid of a thyratron tube 305, to form a bias circuit therefor. The source 301 provides a maximum bias voltage which is ample to prevent firing of thyratron 305 for the maximum permissible anode voltage. The thyratron characteristics are such that high levels of grid bias are needed to prevent firing when large values of anode voltage are applied, but with lower anode voltages, the thyratron will be held off by lower values of bias. If the bias decays below the hold-off bias for any given anode voltage, the thyratron fires.

The voltage which is applied to the anode of thyratron 305, is obtained as follows:

On drum 112 there are provided three additional control tracks 112b with sensing heads 116′. The heads 116′ are connected to two-condition switching circuits 401 which assume one condition or another, depending on whether or not the sensing heads sense a magnetic spot on the tracks. The three switching circuits establish a combined total of eight combinations of conditions. These three circuits have control connections as illustrated to eight gates 402, each of which is of a type to respond to a particular condition at all three of its control connections and will permit the passage of current for a particular combination of conditions of the switching circuit. The gates are connected to different points on a voltage divider 403, energized by a direct-current source 404, and the gates are connected to a common line 406 that extends to the anode of thyratron 305. Only one gate 402 is conductive for any possible combination of conditions of circuits 401, so that circuits 401 and gates 402 determine which tap of the voltage divider is to supply the thyratron with anode voltage. Depending on which tap is thus selected, and depending on the voltage of source 404 and the grid-bias circuits 301, 303, 304, the thyratron 305 can be made to fire at any particular selected time interval after the unbalancing of the pressures in at least one of the pairs of lines 34a, 34b of one of the actuators 18, 18′, etc. Thus by selective actuation of the circuits 401, a time interval is established in which the concurrent programmed strokes of all the actuators must be carried out. By providing three switching circuits and eight gates, there is thus afforded wide variations in time periods that may be allowed for different operations. For example, short strokes with no load in jaws 30, 32, may be executed quickly, while the operation of withdrawing a casting from a casting machine may take a greater length of time.

If at least one of the actuators 18, 18′, etc. has not moved to its programmed position within an established time period, the thyratron 305 fires and relay 405 is energized. The energization of this relay will cause the closing of contacts 405a which is connected to actuate pressure reducer 294 and alarm 300. This operation has been discussed above in connection with relay 60 and strain gage 72, which will have the same effect. After the cause of the delayed operation is corrected, a spring-loaded normally closed switch 307 in the anode circuit of thyratron 305 is opened manually. This extinguishes thyratron 305, to continue the programmed operation of the apparatus.

Figure 5A:
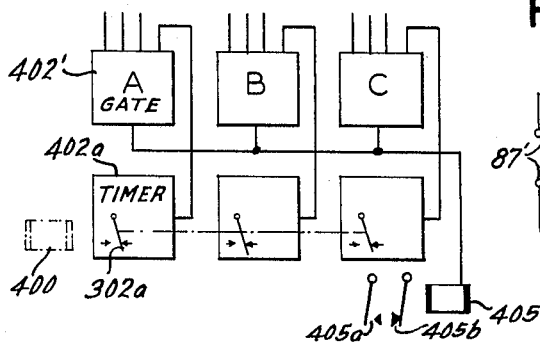
FIGURE 5a is a modified detail of FIG. 5.

The times available for selection by the matrix including circuits 401 and 402 are related to the extent of using a common voltage divider and a common decay circuit 303, 304. Advantageously each unit 402 can be provided with its own timing circuit, as shown in FIG. 5a. A number of gates 402′ are provided having four control or input connections. Three of the four input connections of gates 402′ extend via matrix connections to combination control devices as illustrated in FIG. 5. The fourth input connection of each gate extends to its individual timer 402a. Each timer 402a may assume the form of the timer in FIG. 5 including elements 301–306, timers 402a being controlled by a common relay solenoid 400 as shown. The several timers 402a have respectively different and completely independent delay timers, which may be established by adjusting the values of resistance and capacitance where the timer circuit of FIG. 5 is used. Only one gate 402′ can provide an output signal since all but one are disabled by their groups-of-three matrix control connections. The selected gate 402′ will not produce an output signal until the delay time of its timer 402a has elapsed. Relay 405 has a common connection to the output of gates 402′.

At the start of each motion to be timed, relay 400 is deenergized and one of the gates 402′ is selected. Its timer 402a starts its interval timing operation. If its time runs out while relay 400 is still deenergized, relay 405 is energized to produce the effects already described. If actuators 18, 18′, etc complete their operations within the limit of the selected timer 402′, relay 400 is energized for re-starting all the timers and programmed operation of the apparatus continues.

Figure 5B:
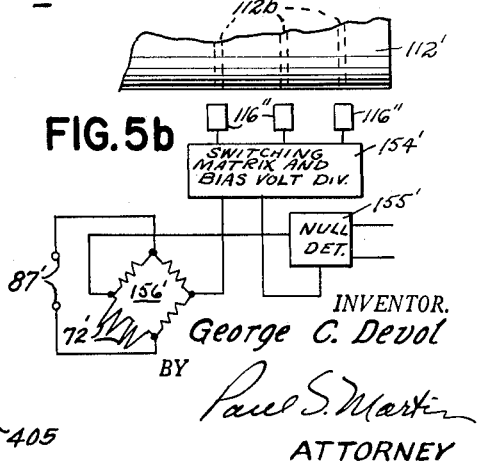
FIGURE 5b is another modified detail of FIG. 5.

It will be recalled that, in FIG. 5, the program tracks 112b and the circuit controlled by those tracks is adapted to establish a variety of voltages under program control. Such selectively determined voltages can be utilized in monitoring other operations. Thus, bias source 154 may be a variable program-controlled source duplicating circuit 116′, 401, 402, 403, 404 and 406, in which case different levels of strain can be established for different operations among a programmed sequence of operations. Such a circuit is shown in FIG. 5b, wherein drum 112′ having tracks 112b′ sensed by pickup heads 116″ to control a switching matrix 154′ such as that represented by components 401, 402, 403, 404 and 406 in FIG. 5. The remainder of the strain detection circuit in FIG. 5b includes components bearing primed numerals corresponding to those in FIG. 5, described above.

Both in connection with the strain detector and the motion timer, having respective output-control relays 60 and 405, it is desirable to interrupt further programmed operation of the machine when a faulty condition has been detected. For this purpose, normally closed relay contacts 60b and 405b (FIG. 4) are included in the control circuit of cycle timer 120. If either of these relay contacts should open, due to firing of one of the thyratrons 100 or 305, then advance of the cycle timer 120 is prevented and operation of the whole apparatus is interrupted.

In both the arrangement with the strain gage and with the motion timer means, it is seen that specific criteria have been established for the operation of the apparatus, and failure of the apparatus to perform within such criteria will cause suspension of the operation of the apparatus.

Numerous modifications of the disclosed apparatus and methods will become evident and such modifications are not deemed to depart from the invention if defined by the appended claims.

What is claimed is:

1. Apparatus for engaging an article and then applying force to said article to displace the article, said apparatus comprising: article holding means, means for supporting and moving said article holding means, control means operative in accordance with a preestablished control program and coupled to the article holding means and to the means for supporting and moving the latter to cause the article holding means to first grip the article and thereafter be displaced, delay timing means whose delay timing is initiated in operation at the start of a program-controlled operation of the supporting and moving means and operation-monitoring means operative subject to said delay timing means for selectively interrupting the operation of the supporting means but only if the monitored condition is not satisfied at the end of the time interval of the delay timing means.

2. Apparatus for performing a specific function on an article, said apparatus comprising an arm element, a support element supporting said arm element for movement, actuator means connected to the arm element for moving the same, control means operatively associated with the actuator means to selectively operate the same to move said arm element to perform the specific function on the article, strain sensitive means associated with at least one of said elements for sensing strain thereof, strain-evaluating means containing said strain sensitive means and containing means establishing a reference, and further containing comparing means jointly responsive to said strain sensitive means and to said reference means to provide control output in the event of excess strain being imposed on said arm element, means responsive to the output of said strain-evaluating means for modifying the operation of the apparatus, and delay timing means whose timing operation is initiated at the start of an operation of the actuator under control of the control means for deferring the response of said responsive means to said strain-evaluating means, thereby to allow the actuator to complete the controlled operation but only if there is no excessive strain at the end of the time prescribed for the operation.

3. Apparatus for operating on an article to perform a specific function, said apparatus comprising: a work device, support means supporting said work device for movement, actuator means connected to the work device for moving the same, control means operatively associated with the actuator means to selectively operate the same to move said work device to perform the specific function on the article, means monitoring the operation of said work device to indicate completion of the specified function, said control means including means establishing a prescribed time interval in which the desired function is to be completed, and timing means responsive to said monitoring means and to said time establishing means for indicating failure of the work device to perform the desired function within the prescribed time interval.

4. Apparatus for causing a member to perform a prescribed function, said apparatus comprising an actuator associated with said member and having a neutral state in which the actuator does not tend to operate the member and an activated state in which the member is acted upon by the actuator for carrying out said function, a master control device, feedback means coupling said master control device to said actuator for returning the latter to the neutral state as the member performs the function thereof, means indicating when the actuator is in its neutral state, timer means for representing a prescribed time period in which the member is to perform the prescribed function and timing means connected to said indicating means and to the timer means for indicating failure of said actuator to be returned to the neutral state within the prescribed time period.

5. Apparatus for performing a specific function on a member, said apparatus comprising: a work device, support means supporting said work device for movement, hydraulic actuator means including two separate hydraulic lines, said actuator means being connected to the work device for controlling movement thereof in accordance with the passage of pressure fluid in the hydraulic lines, means for controlling the flow of pressure fluid in said lines to in turn control movement of the work device, means establishing a time period in which the desired movement of the work device is to be effected, said lines at the completion of the desired movement having equal pressure therein, means connected to said lines and responsive to a difference of pressure of the pressure fluid therein to indicate continuing operative effort of the work device, and means controlled by the last named means for comparing the elapsed time during that movement with the established time period for indicating failure of the work device to complete the desired movement within the established time period.

6. Programmed apparatus adapted to remove an article from a supply position, said apparatus comprising an arm movable in multiple degrees of freedom, operating means therefor having control means, a program device and sensing means arranged to control the operating means, an article holder on said arm for gripping an article disposed at a supply position, said arm being controlled by said operating means to withdraw an article when gripped by the article holder, means for sensing a measure of the force applied to said arm to detect a condition in which the arm does not withdraw the article, a delay timer coordinated with said operating means to start measuring a time interval at the start of control of the operating means to withdraw the article, and means responsive to said force sensing means and to said delay timer for signalling the existence of excessive strain at the end of said time interval.

7. Apparatus as claimed in claim 6 wherein said means for sensing a measure of the force in said arm includes strain sensitive means on said arm arranged to respond to the strain therein.

8. Programmed apparatus adapted to remove an article from a supply position, said apparatus including an arm movable in multiple degrees of freedom, means for actuating said arm including program means, sensing means cooperating with said program means and actuator-controlling means responsive to said sensing means, an article holder carried by said arm and movable thereby to engage an article at a supply position, a vibratory impact means closely associated with said article holder for repeatedly imposing sudden article-releasing stresses to an article gripped by the article holder, and additional program means coordinated with said first-mentioned program means to actuate said article holder to grip an article and to activate said impact means.

9. Programmed apparatus in accordance with claim 8, wherein all said program means control said vibratory impact means and said actuating means to supply article-removing effort at the same time that said vibratory impact means is activated.

10. Apparatus in accordance with claim 8, including means for indicating completion of a motion of said arm in withdrawing an article from the supply position, a motion timer and means responsive to said motion-completion indicating means and said timer for suspending operation of the apparatus in the event that the article has not been withdrawn from the supply position in a prescribed time.

11. Apparatus comprising an article holder, a vibrating device connected to the article holder for vibrating the same, actuator means for moving said article holder, program control means associated with the actuator means and the article holder to instruct the same to move to a position in which the article holder can engage an article, said program control means being also associated with the vibrating device to operate the same and thereby vibrate the article holder and tend to free an engaged article, said article holder being movable by the actuator means under the influence of the program control means in a direction tending to displace the article and thereby disengage same.

12. Programmed apparatus including an arm movable in multiple degrees of freedom, an article holder carried thereby, programmed actuating means for said arm and for said article holder to move same through a sequence of positions and to engage and release an article as required, said programmed actuating means including program means providing a sequence of position instructions, sensing means cooperating with said instructions in sequence, control means controlled by said sensing means, and multiple actuators controlled by said control means, means indicating completion of arm motions pursuant to each instruction to initiate further programmed operation, time-interval selecting program means coordinated with said position-instruction program means to establish a particular time interval for at least certain arm motions, and timing means controlled by both the time interval selecting means and motion-completion indicating means adapted to control further program-controlled operation of the apparatus.

13. Programmed apparatus comprising movable means movable in multiple degrees of freedom and including article holder means, the apparatus further comprising programmed actuator means for both aforementioned means to move the same through a sequence of positions to cooperate with an article, said programmed actuator means including means for providing a sequence of position instructions, sensing means responsive to said position instructions, a plurality of actuators, and control means controlled by the sensing means for operating the actuators, means indicating completion of motion of the movable means pursuant to each instruction, to initiate further programmed operation, time interval selecting program means, coordinated with said means which provides the sequence of position instructions, to establish a particular time interval for at least certain motions of the movable means, and timing means controlled by both the time interval selecting means and the means indicating completion of motion of the movable means to control further program controlled operation of the apparatus.

14. Programmed apparatus comprising movable means movable in multiple degrees of freedom and including article holder means, the apparatus further comprising programmed actuator means for both aforementioned means to move the same through a sequence of positions to cooperate with an article, said programmed actuator means including means for providing a sequence of position instructions, sensing means responsive to said position instructions, a plurality of actuators, and control means controlled by the sensing means for operating the actuators, program control means including a program record and sensing means therefor for establishing criteria for said movable means in the movement thereof through a plurality of said positions, respectively, and monitoring means controlled by said program control means and operative to detect whether the movable means operates in accordance with the particular criterion established for each movement thereof.

15. A method of freeing an engaged element by means of a program controlled article holding device, said method comprising gripping the engaged element with the article holding device, vibrating the article holding device after the same has gripped the element to promote release of the engaged element, applying a force to the engaged element by the article holding device which force tends to free the engaged element and displace the same, sensing a measure of the force in said article holding device and terminating the application of force to the engaged element by the article holding device when the sensed force in said article holding device exceeds a preestablished maximum.

16. Apparatus in accordance with claim 3, further including means representing the magnitude of a parameter of said specific function additional to said prescribed time interval, and further monitoring means for indicating compliance of the operation with the additionally represented parameter, said further monitoring means including means to compare the represented parameter magnitude with that which is in effect during performance of the specific operation.

17. Apparatus comprising a mechanically operable device movable through a series of strokes, servo actuator means for operating said device, means for detecting match between the input and output portions of the servo actuator means, control means for causing said servo actuator means to operate said device through a series of strokes, means coordinated with said control means and effective to indicate an elapsed time after the start of a particular stroke of said operable device at which the stroke should have been completed, and monitoring means responsive jointly to said coordinated means and said match detecting means for signalling failure of the servo actuator means to complete a particular stroke within a prescribed time interval.

18. Programmed apparatus comprising a movable member, actuating means for effecting operations of said movable member, first program control means for said actuating means to effect operation of said movable member through a sequence of positions including at least one stroke, means for indicating completion of said stroke by said actuating means, elapsed time measuring means, coordinating means for initiating a timing operation of said elapsed time measuring means concurrently with the start of said one stroke of operation, second program control means operable coordinately with said first program control means for representing time intervals within which at least certain of the related operations of the first program control means should be carried out, means for comparing a time interval representation of the second program control means with the elapsed time measuring means, and means responsive to said comparing means and to said stroke-completion indicating means to signal failure of the actuating means to complete said one stroke within the represented interval.

19. Apparatus comprising a movable member, means for moving the member through a sequence of positions including at least one position and a next position, means for detecting arrival of said movable member at least at said next position, a timer for establishing a particular time interval within which the movement of said member from said one position to said next position should be completed, coordinating means for concurrently initiating a timing operation of said timer and an operation of the moving means to move said movable member from said one position to said next position, and means controlled by said timing means and said detecting means to indicate the failure of said movable member to reach said next position within said particular time interval.

20. Program-controlled apparatus comprising a work device, actuator means for the work device, first program control means for feeding successive instructions to the actuator means for successively operating the work device, second program control means coordinated with said first program control means establishing a limit of force that may be developed by the work device in at least a certain operation thereof, each of said program control means having a control recording and sensing means therefor, means for detecting the force developed by the work device during said certain operation, and means responsive to said second program means and said detecting means for indicating the occurrence of a force developed by the work device that exceeds the limit established by the second program means.

21. Program-controlled apparatus comprising a work device, actuator means for the work device, first program control means for feeding successive instructions to the actuator means for causing the work device to carry out successive operations, second program means coordinated with said first program control means for representing respective time periods in which certain of the operations of the work device are to be performed, each of said program means having a control recording and sensing means therefor, and means responsive to said second program control means for detecting failure of the work device to carry out said certain successive operations within said respective time periods.

References Cited by the Examiner

UNITED STATES PATENTS

| | | | |
|---|---|---|---|
| 2,455,823 | 12/1948 | Tauber | 318—488 X |
| 2,592,223 | 4/1952 | Williams | 73—88.5 |
| 2,861,700 | 11/1958 | James | 214—1 |
| 2,903,635 | 9/1959 | Brooke | 218—488 X |
| 2,988,040 | 6/1961 | Aitken. | |
| 2,988,237 | 6/1961 | Devol | 214—11 |
| 2,998,560 | 8/1961 | Mottu | 318—20 |
| 3,072,264 | 1/1963 | Sennebogen | 212—39 |
| 3,157,148 | 11/1964 | Reed | 73—88.5 X |

MARVIN A. CHAMPION, *Primary Examiner.*